July 28, 1942.　　P. DUMAINE ET AL　　2,291,456
METHOD OF MAKING FRAME PLATES FOR WATCHES AND THE LIKE
Filed Dec. 9, 1938　　6 Sheets-Sheet 2
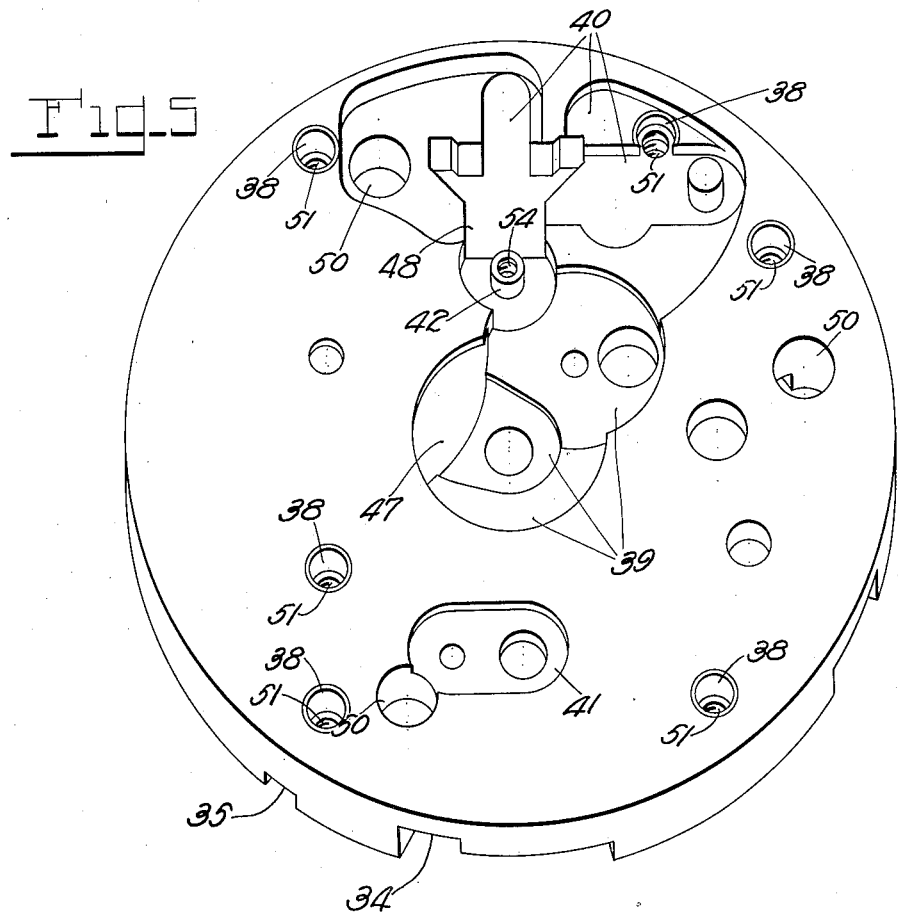
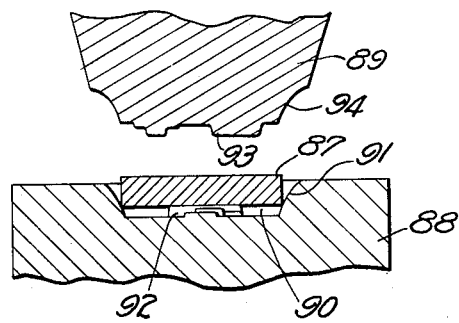
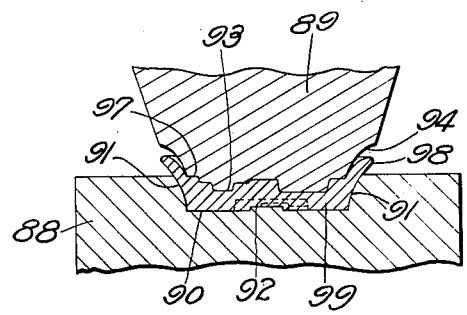

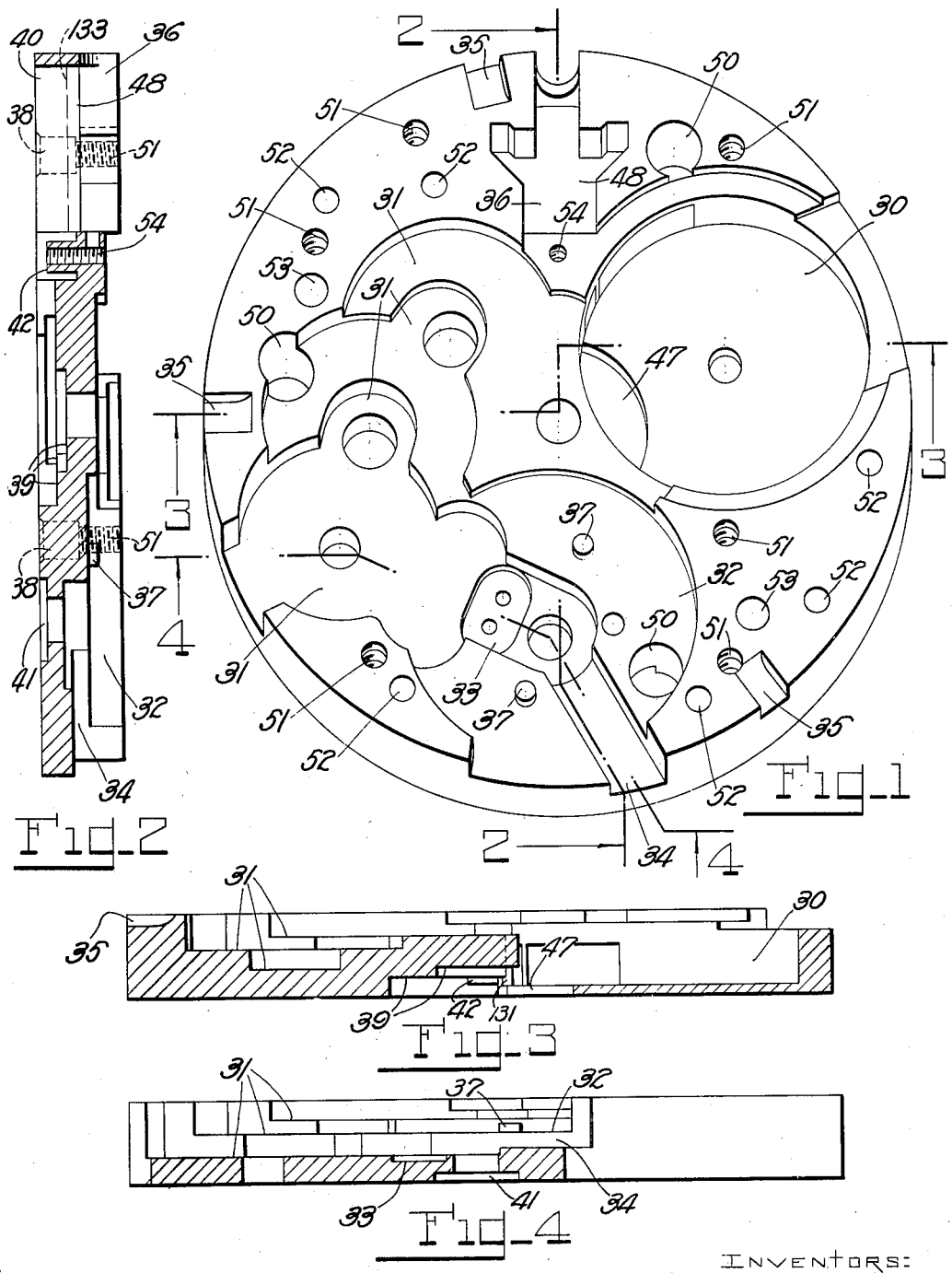

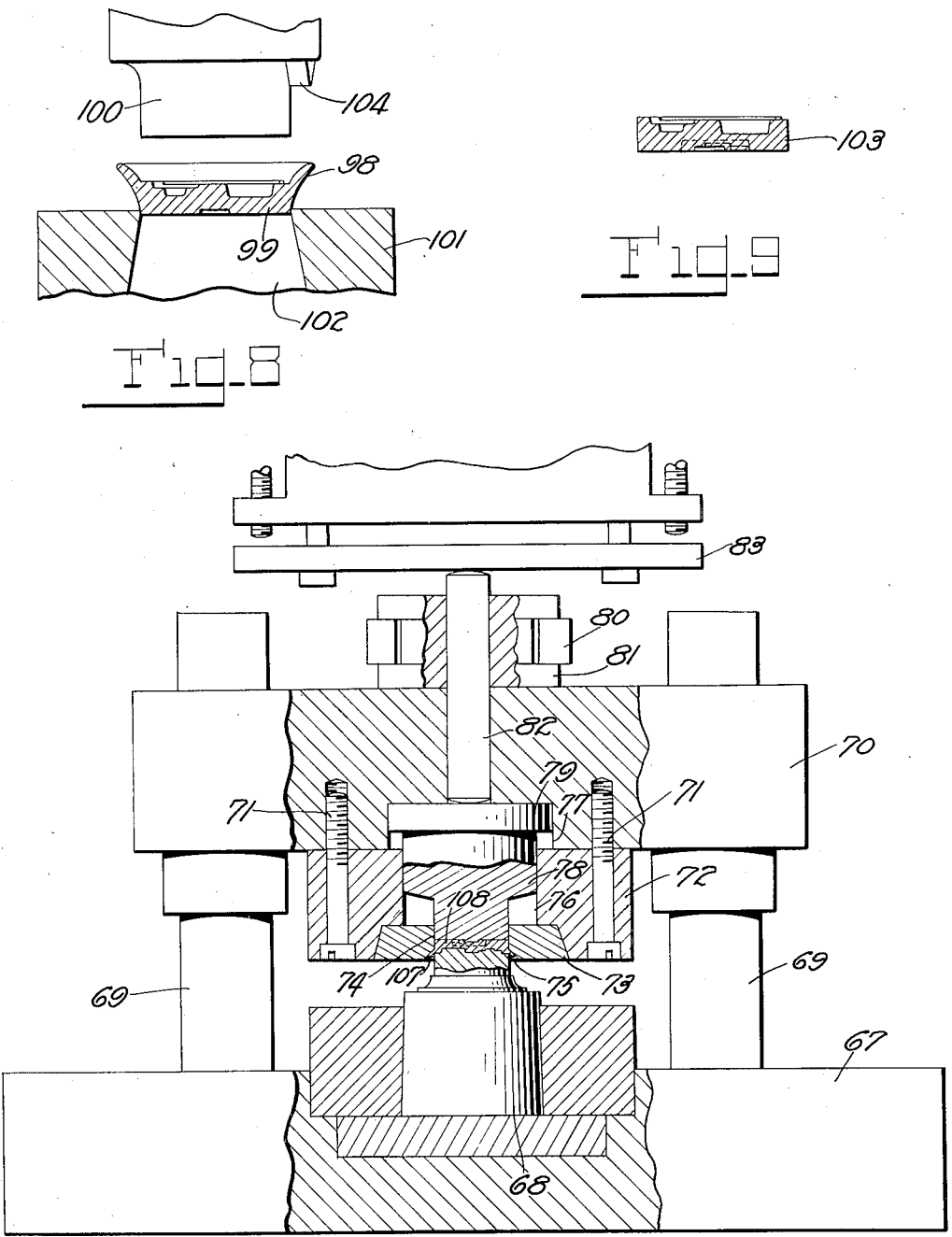

July 28, 1942.  P. DUMAINE ET AL  2,291,456
METHOD OF MAKING FRAME PLATES FOR WATCHES AND THE LIKE
Filed Dec. 9, 1938  6 Sheets-Sheet 4

INVENTORS:
Pierre Dumaine
Arthur P. Emmert
by Dike, Calver & Gray
Attys.

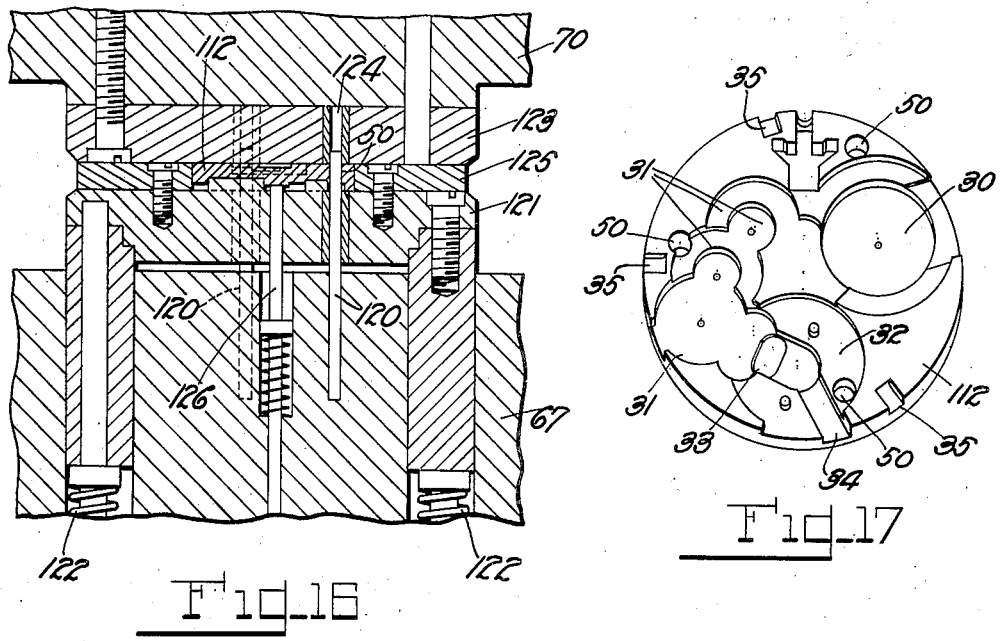
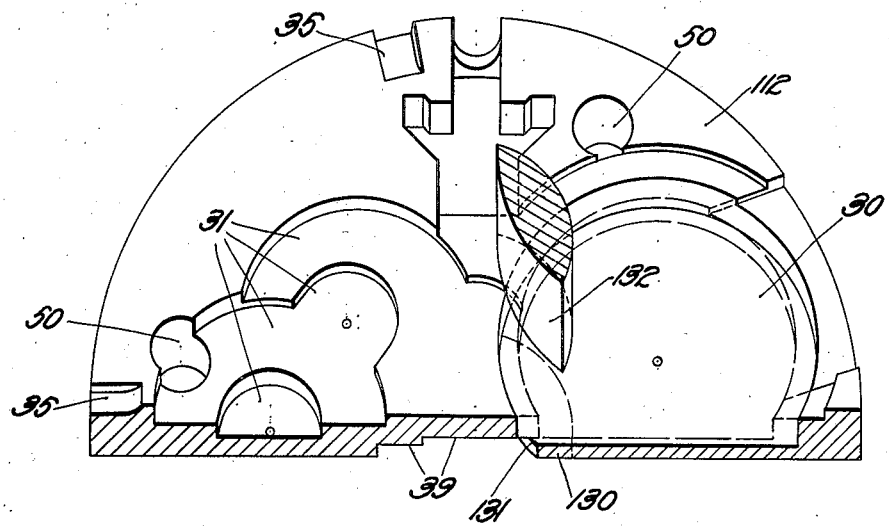

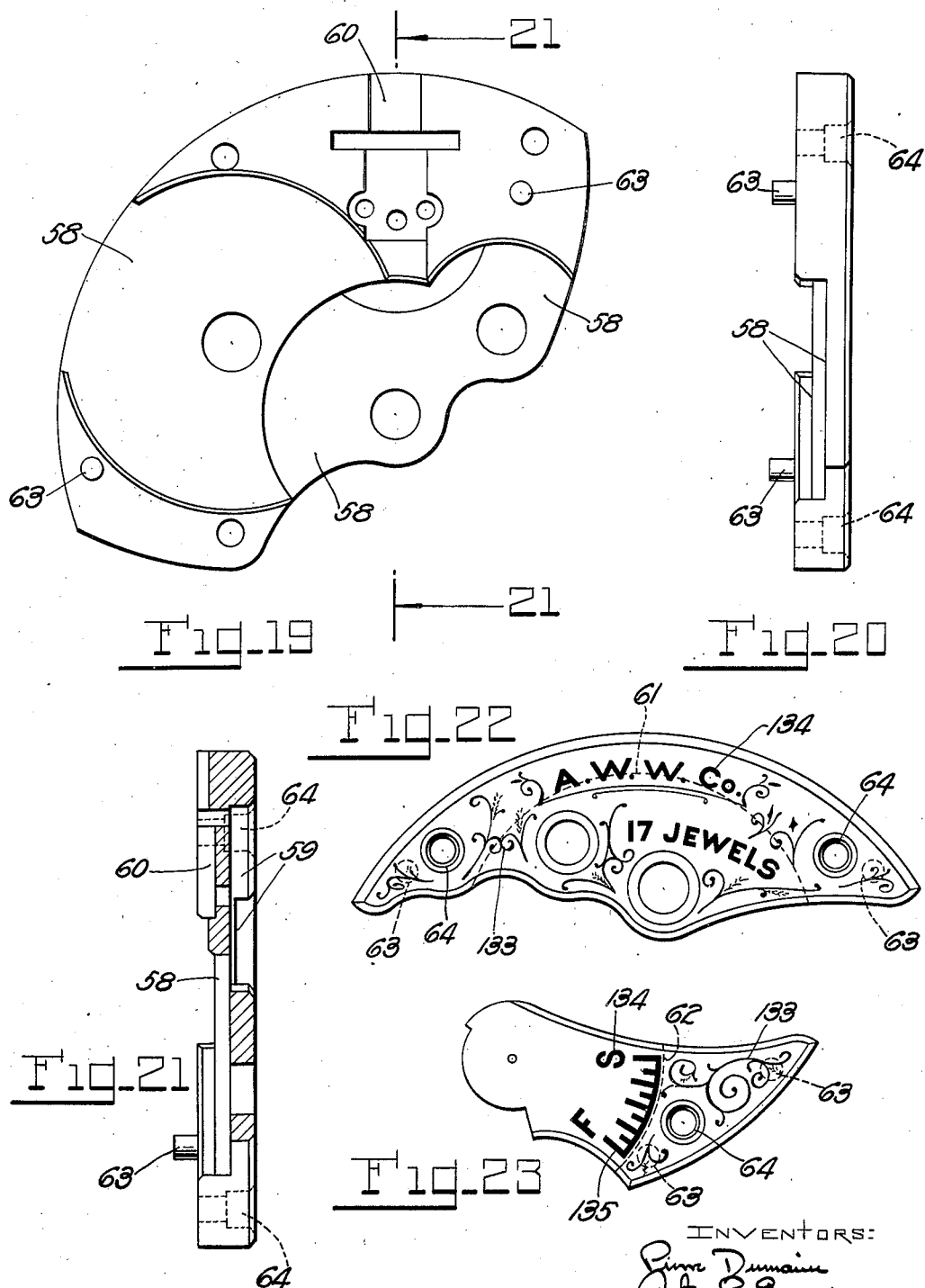

Patented July 28, 1942

2,291,456

UNITED STATES PATENT OFFICE 2,291,456

METHOD OF MAKING FRAME PLATES FOR WATCHES AND THE LIKE

Pierre Dumaine, Waltham, Mass., and Arthur P. Emmert, Muncie, Ind., assignors to Waltham Watch Company, Waltham, Mass., a corporation of Massachusetts Application December 9, 1939, Serial No. 308,358

7 Claims. (Cl. 29—177)

This invention relates to the manufacture of frame plates for watches and similar timepieces and has for its object to simplify the production of such parts while insuring the accuracy of their dimensions, proportions and configurations.

The frame for a conventional watch or similar movement comprises a plurality of plates so assembled as, at least in part, to enclose the several parts of the movement and provide the necessary supports, bearings, etc., therefor. The plates usually include a pillar plate, located at the dial side of the movement and substantially coextensive therewith, and, at the opposite side, a barrel bridge which carries the main spring and associated parts, a train bridge carrying one set of bearings for the timing train, and a balance cock which supports one of the bearings for the balance staff or arbor. These several plates must be accurately formed as to size, shape and thickness, they must be accurately positioned and fixed with respect to one another, and must be provided with means whereby the accuracy of their assembly may be effected and insured. Also, these plates, particularly on their inner or joint faces, but also, in the case of the pillar plate and barrel bridge, on their outer faces, must be formed with recesses and projections to receive and support various parts of the movement and associated devices, these being disposed in assymetrical and more or less overlapping relationship and being of different heights and depths, so that the configuration of the faces of these plates, particularly the pillar plate, is extremely intricate and complicated. Furthermore, the centers for the jewel bearings and other parts must be located with the utmost accuracy. The permissible tolerances with respect to all of these factors are extremely small, being of the order of hundredths of a millimeter and, in some instances, of the order of thousandths of a millimeter. Heretofore the production of these plates has involved a long succession of turning, profiling, and locating operations requiring a very high degree of skill on the part of the operators in order to achieve the requisite accuracy, and making their production correspondingly expensive and uniformity difficult. In accordance with the present invention, many of these hitherto necessary delicate operations are eliminated and replaced by a relatively few simple operations which are, for the most part, automatically self-controling, thereby materially reducing the time and skill required for the production of such articles and making their accuracy and uniformity more certain.

It is customary to provide frame plates of the character referred to, or some of them, with surface markings in the nature of ornamentation, lettering, gauge or scale marks, etc., which have usually, for the most part, been applied by engraving and similar processes. In accordance with one feature of the invention, the application of these markings is simplified, some, at least, being automatically applied as an incident to the formation of the plates themselves.

The invention will best be understood from the following description of the manufacture, in accordance therewith, of certain frame plates, as illustrated in the accompanying drawings, this description and illustration having, however, been chosen for purposes of exemplification merely, as it will be obvious to those skilled in the art that the invention, as defined by the claims hereunto appended, may be otherwise practiced without departure from the spirit and scope thereof.

In said drawings:

Fig. 1 is a perspective view, greatly enlarged, of a pillar plate as produced in accordance with the invention, looking from the joint side.

Figs. 2, 3 and 4 are sections on the lines 2—2, 3—3, and 4—4, respectively, Fig. 1.

Fig. 5 is a view similar to Fig. 1 showing the dial side of the plate.

Figs. 6 and 7 are fragmentary sectional views illustrating the first operation on the blank in the formation of a pillar plate.

Fig. 8 is a view similar to Figs. 6 and 7 illustrating a second operation.

Fig. 9 is a sectional view of the work after the operation shown in Fig. 8.

Fig. 10 is a fragmentary vertical section of a press suitable for performing the preceding and certain succeeding operations.

Fig. 16 is a view similar to Figs. 6 and 7 illustrating another optional, but preferred, operation.

Fig. 17 is a plan view of the joint side of the pillar plate after the operation shown in Fig. 16.

Fig. 18 is a sectional perspective view of the pillar plate illustrating the final step of a process embodying the invention.

Fig. 19 is a plan view of the joint side of a barrel bridge as produced in accordance with the invention.

Fig. 20 is an edge view thereof, looking from the right in Fig. 19.

Fig. 21 is a section on the line 21—21, Fig. 19.

Fig. 22 is a plan view of the outer side of a train bridge.

Fig. 23 is a similar view of a balance cock.

Figure 11:
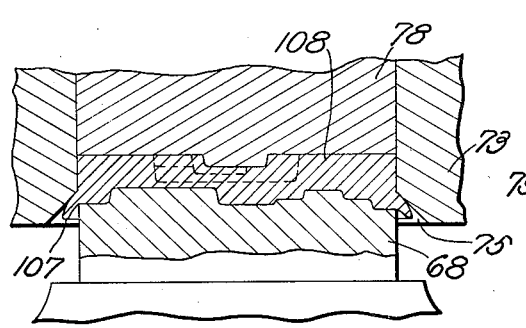
Figs. 11 and 12 are views similar to Figs. 6 and 7 illustrating a third and a fourth operation, respectively.

In Figs. 1 to 5 is illustrated, on a greatly enlarged scale, a typical pillar plate which, as shown, is circular, but which may be of oval or other form depending upon the type of watch in which it is to be used. This plate, in addition to certain openings hereinafter referred to which extend entirely therethrough, is formed on its opposite faces with certain recesses and projections to receive, position and support other parts. On the joint side, as shown in Figs. 1 to 4, these recesses and projections include a cylindrical recess 30 to receive the main spring and barrel, a series of cylindrical recesses 31 of varying diameters and depths to receive the several gears of the timing train connecting the main spring and escapement, said recesses 31 being arranged in more or less overlapping relationship to permit interengagement of the gears, a cylindrical recess 32 for the balance wheel, a recess 33 in which are mounted the banking screws which limit the motion of the escapement pallet, a channel 34 for convenience in observing the operation of escapement, pry slots or notches 35 for assistance in separating the plates, a recess 36 for the clutch forming part of the winding and setting mechanism, and a pair of studs or integral dowels 37 for supporting the pallet bridge which carries one of the bearings for the pallet staff. On the dial side, as shown in Figs. 2 to 5, the pillar plate is formed with clearance holes 38 to receive the ends of the screws for attaching the other frame plates, a series of overlapping cylindrical recesses 39 of various diameters and depths to receive the gears of the dial train, recesses 40 for the winding and setting mechanism, a recess 41 for the end stone for the pallet staff, and a boss 42 for the winding mechanism retaining screw. The recess 30 on the joint side overlaps and communicates with one of the recesses 39 on the dial side, as shown at 47 in Figs. 1, 3 and 5, and the recess 36 communicates with a portion of the recess 40, as shown at 48 in Figs. 1, 2 and 5 thereby forming openings extending completely through the plate at these points. Other openings extending through the plate include three work holes 50 by which the plate is positioned for certain finishing and assembly operations, screw holes 51 alined with the clearance holes 38 for receiving the attaching screws, dowel holes 52 for receiving the barrel bridge, train bridge and balance cock dowels hereinafter referred to, other dowel holes 53 for the usual dial attaching dowels, not shown, and a screw hole 54, Figs. 1, 2 and 5, alined with the boss 42 for receiving the winding mechanism retaining screw.

Like the pillar plate, the barrel bridge (Figs. 19 to 21) has formed in its joint and outer faces overlapping cylindrical recesses, 58 and 59, respectively, of different depths to receive the spring barrel, the gears of the winding train, and certain of the gears of the timing train, the recesses 58 registering with the recess 30 and certain of the recesses 31 in the pillar plate. It is also formed in its joint side face with a recess 60, registering with the recess 36 in the pillar plate, to receive the winding stem. The train bridge (Fig. 22) is formed in its joint side face with an overlapping cylindrical recess 61, registering with certain of the recesses 31, to receive certain of the gears of the timing train, while the balance cock (Fig. 23) is formed in its joint side face with a recess 62, registering with a part of the recess 32, to receive the balance wheel. All of the three last named plates are formed on their joint sides with projecting studs or integral dowels 63 which enter the dowel holes 52 in the pillar plate, and, extending through from their outer sides, with countersunk holes 64 to receive the attaching screws which enter the screw holes 51 in the pillar plate.

All of the recesses and projections, above referred to, in each of the several plates, must be located and formed with extreme accuracy, and the production of such plates has heretofore involved a long succession of intricate and skillfully controlled turning, profiling, locating, etc., operations which, in accordance with the present invention, are replaced by a relatively few, simple swaging and punching operations of such a nature that the required accuracy is automatically insured. These operations are performed in a suitable die or punch press. While the same press may be employed for the several operations or steps, it is preferred to use separate, but similar presses since different tools and ranges of stroke are required in the successive steps. A type of press suitable for the practice of the invention is shown, in part, in Fig. 10. This press comprises a bed 67 which suports a lower die or swage block 68. Slidably mounted on uprights 69 carried by the bed is a movable platen 70 to which is secured, as by screws 71, a head 72 carrying a hardened steel block 73, the latter having an opening 74 alined with the lower die 68. As shown in Fig. 10 and in certain other figures hereinafter referred to, the opening 74 terminates in a flaring or countersunk portion 75 at its edge adjacent the lower die. Slidably mounted in the opening 74, and in alined openings or recesses 76 and 77 in the head 72 and platen 70 is an upper die or swage block 78. The recess 77 is slightly larger in diameter than the bore 76, and the die 78 is formed with an enlarged head 79 substantially fitting said recess, so that said die is moved downwardly by the platen when said head is engaged by the upper wall of the recess and is raised thereby when said head is engaged by the top of the head 72. The platen is reciprocated by a lever (not shown in full) the forked end 80 of which engages a grooved projection 81 on the top of the platen. Slidably mounted in the platen in a plunger 82 which, when the platen rises, engages a fixed abutment 83 on the press frame and acts to eject the work from the block 73.

Except as hereinafter pointed out, the operations of forming the several frame plates above described are similar but will be described in detail in connection with the pillar plate.

A blank 87 (Fig. 6), in this case circular, of suitable metal, preferably brass, is first prepared, either by punching from sheet stock or by cross cutting a bar of suitable cross section. The thickness of this blank is slightly less than the maximum or overall thickness of the projecting portions of the finished plate, the extra thickness being obtained by the upsetting action of the swaging operation as hereinafter explained.

The dies employed in the initial swaging step of the process, as shown in Fig. 6, comprise a lower die 88, corresponding to the die 68 of Fig. 10, and an upper die 89, corresponding to the die 78 of the latter figure. The die 88 is formed with a cavity 90 corresponding in outline with that of the blank, having upwardly flaring or diverging walls 91, and having its bottom 92 formed generally complementary to the dial side of the plate to be produced. The die 89 has its lower face 93 formed generally complementary to the joint side of the plate and is cut away at its edge, as shown at 94, opposite the flaring walls 91 of the die 88. By the statement that the die faces 92 and 93 are generally complementary to the respective sides of the plate is meant that these faces are of such configuration as to roughly form the desired recesses and projections, but with slightly tapered sides and rounded corners; i. e., without the sharpness of definition required in the finished product.

The blank 87 is dropped into the cavity 90, being automatically centered or positioned by the flaring walls 91, and the upper die 89 brought downwardly to squeeze or press the blank between the dies as shown in Fig. 7. The projecting portions of the die faces are forced into the blank to roughly form the recesses therein, other parts of the blank being upset to increase the thickness thereof at such points, as shown, for example, at 97, and more or less of the excess metal of the blank being forced outwardly between the walls 91 and cut away portions 94 in the form of an edge flashing 98. This die pressing is done cold and is carried as far as reasonably permitted by the hardening of the metal under the swaging pressure, resulting in depressing the recesses, in rough form, into the metal to approximately their full depth.

The partly formed work piece 99 resulting from the swaging operation illustrated in Fig. 7 is then placed in a press in which the swaging dies are replaced by a punch 100 (Fig. 8) and punch die 101, the diameter of the former, and that of the opening 102 in the latter, being substantially equal to or slightly greater than the minimum diameter of the work piece 99. Said work piece is located in said opening 102, and the punch 100 descends and, in cooperation with the edge of said opening, shears off the flashing 98, leaving the work piece in the condition shown at 103 in Fig. 9. The punch 100 is preferably formed with a wedge-like radial cutter 104 to cut the trimmed off flashing and facilitate its removal.

The work piece 103 is then annealed, preferably in a hydrogen atmosphere to avoid tarnishing, and is again die pressed or swaged in a press having its dies arranged as shown in Figs. 10 and 11. The faces of the dies 68 and 78 of this press, are substantially the same as, and preferably identical with, the dies 89 and 88, respectively, as shown in Figs. 6 and 7 but are reversed, that is to say, the die 68 having its face complementary to the joint side of the plate at this stage is placed at the bottom, and the die 78 corresponding to the dial side being at the top. The work piece 103 is located on the die 68 by interengaging its partly finished joint side face with the complementary face of the die. In this pressing or swaging operation the faces of the dies are caused to approach one another somewhat more closely than the faces of the dies in the operation illustrated in Figs. 6 and 7, thereby further depressing the recesses into the work piece, correspondingly reducing the thickness of the latter (while still leaving it of a maximum thickness somewhat greater than that of the original blank), and causing the excess displaced metal to flow into the countersunk portion 75 of the block 73 in the form of an edge flashing 107.

Figure 12:
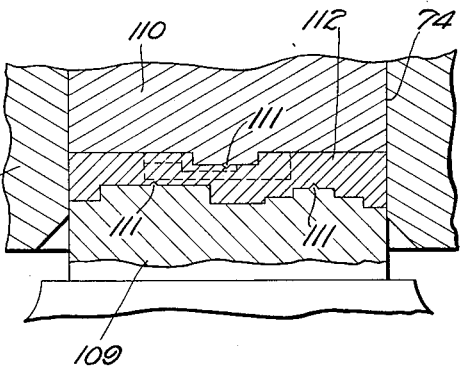

The resulting work piece in the condition shown at 108 in Figs. 10 and 11 is then given a final pressing, to trim the plate to size by removing the flashing 107 and accurately finish the recesses and projections thereon, in a press having dies as shown in Fig. 12. These dies include a lower die 109 having its face accurately complementary (except as hereinafter pointed out) to the joint side of the plate in its finished form, and an upper die 110 having its face similarly complementary to the dial side. For this operation the work piece 108 is located in the press by interengagement of its joint side with the face of the die 109, in the same way as the work piece 103 is located for the operation illustrated in Figs. 10 and 11. The arrangement of the dies 109 and 110 in the press is such that, upon the completion of the pressing stroke, the face of the die 110 is above the lower end of the opening 74 in the block 73 which is entered by the die 109, thereby trimming the plate to size by shearing off the flashing 107. In this pressing operation the various recesses and projections on both sides of the plate are, for the most part, accurately finished with the desired sharpness of definition, the metal being further forced into the squarer corners of the die elements and the overall thickness of the plate again slightly reduced. The dies 109 and 110 are further formed with small pointed projections 111 for spotting the bearing, screw hole, etc., centers, thereby accurately and automatically locating the latter by subsequent assembly operations. The end stone cap recess 41, being relatively shallow, can be completely formed in this final swaging operation.

Figure 13:
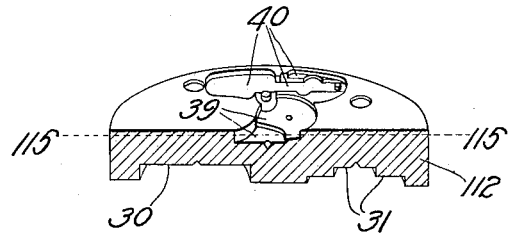
Fig. 13 is a sectional perspective view of the work after the operation shown in Fig. 12.
Figure 14:
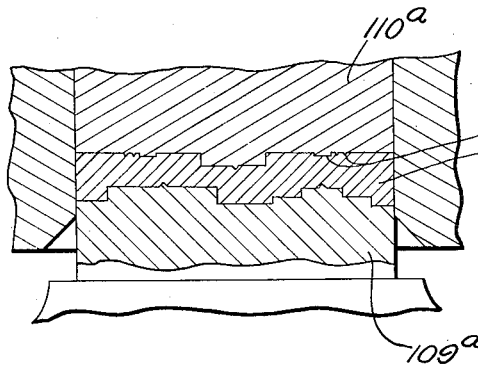
Fig. 14 is a view similar to Figs. 6 and 7 illustrating another and optional operation.
Figure 15:
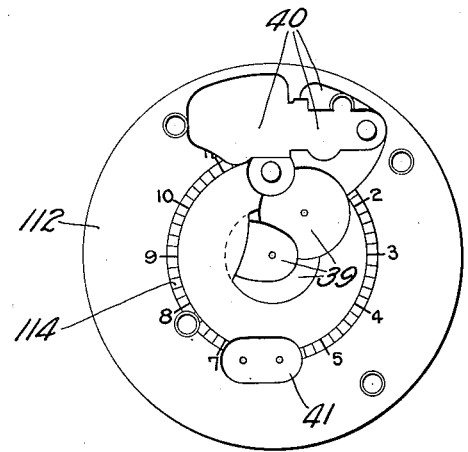
Fig. 15 is a plan view of the dial side of the pillar plate after the operation shown in Fig. 14.

As above stated, the thickness of the original blank 87 (Fig. 6) is less than the maximum or overall thickness of the completed plate, the increased thickness of projecting portions at certain points being obtained by the upsetting action of the swaging operations, but the total volume of the blank is greater than that of the plate, the excess metal being disposed of in the flashings 98 and 107 which are subsequently removed. If desired, the die strokes in the last two pressing operations, illustrated in Figs. 11 and 12, may be such that in the final pressing operation (Fig. 12) the resulting plate 112 will be of exactly the required thickness. In such event, the die 110 may be suitably formed, as indicated at 113 in Fig. 14, to stamp upon the dial side of the plate the usual minute track 114 (Fig. 15) employed for testing prior to the attachment of the dial. Preferably, however, in order further to insure accuracy, the plate 112 resulting from the operation illustrated in Fig. 12 is slightly in excess (by a few thousandths of a millimeter) of that of the required plate, being thereafter faced off to the latter thickness, as indicated by the dotted line 115, Fig. 13. This can be simply and accurately done by a facing machine so set as to reduce all plates to a uniform predetermined thickness irrespective of their initial thickness. When such a facing operation is employed, the minute track 114 can be subsequently applied by an additional pressing between dies 109a and 110a (Fig. 14) of which the latter is suitably formed for this purpose, but which are otherwise identical with the dies 109 and 110.

After the operations above described, the plate 112 is formed with properly located work holes 50 in a press having operative elements as shown in Fig. 16. These include a set of punches 120 supported in upright position by the bed 67, a work support 121 mounted for downward yielding movement in the bed upon springs 122 and having openings through which the punches operate, and a punch die 123 carried by the platen 70 and having openings 124 to receive the punches. The upper surface of the work support 121 has a portion corresponding in configuration to the working face of the die 109, i. e., complementary to the joint face of the plate 112, and surrounding said portion has secured thereto a confining ring 125 having a central opening corresponding in size and shape to the periphery of the plate 112. The punches 120 and die openings 124 are suitably disposed to punch the work holes 50 in a plate 112 positioned on the work support, by interengagement of the joint face of the latter with the surface of the former, when the platen 70 descends and depresses the yielding work support. The confining ring 125 prevents any spreading of the plate 112 during the punching operation. Suitable ejectors 126 (only one of which is shown) may be provided to lift the plate out of the opening in the confining ring when the platen rises.

It is impracticable, in the swaging operations illustrated in Figs. 11 and 12, to bring any portions of the faces of the dies 68, 78 or 109, 110 into interengagement so as completely to force out the metal between them and form openings extending entirely through the plate, as, for example, in forming the intercommunicating opening 47 (Figs. 1, 3 and 5) between the recesses 30 and one of the recesses 39. In order to overcome this difficulty, the portions of the dies 68 and 109 which form the recess 30 are so designed as to form this recess of slightly less diameter and depth than required in the finished plate, as indicated by broken lines in Fig. 18, while the portions of the dies 78 and 110 which form the adjacent recess 39 are so shaped as to leave an undepressed portion 130, Fig. 18, opposite the recess 30. The recess 30 is then turned to its final diameter and depth, as shown in Fig. 3 and in full lines in Fig. 18, thereby cutting through into the recess 39 as shown at 131. This is a simple turning operation which can be readily and accurately controlled. The portion 130 is then removed by a punch 132, Fig. 18, in a press in which the plate is positioned either by interengagement with a complementary work support, as in Figs. 11, 12 and 16, or by means of a work support having studs to enter the work holes 50. Similarly, the die portions for forming the recesses 36 and 40 (Figs. 1, 2 and 5) are so formed as to leave an intervening portion 133, shown in broken lines in Fig. 2, which is subsequently punched out in the same manner as the portion 130, while the die portions for forming the dowel holes 52 and 53 are of such height as to extend only part way through the plate, the remaining metal being likewise subsequently punched or drilled out. These punching operations may be performed concurrently with the punching out of the portion 130, and in the same press, or separately, as preferred. Finally the screw holes 51 and 54 are drilled and tapped in the usual manner, the centers for these holes having been accurately spotted by the dies 109 and 110 in the final swaging operation illustrated in Fig. 12.

The formation of the barrel bridge, shown in Figs. 19 to 21, is substantially the same as that of the pillar plate with such modification as will be obvious without discussion in detail. The same is true of the train bridge (Fig. 22) and balance cock (Fig. 23) except that, as these parts are relatively small, and the depressions therein relatively shallow and of relatively simple configuration, the intermediate flashing trimming operation (Fig. 8), intermediate annealing, second swaging (Figs. 10 and 11), and facing (Fig. 13), or some of them at least, may, in some instances, be omitted, and the work piece, after the first swaging (Fig. 7) pressed in dies corresponding to the dies 109 and 110 which trim the edge flashing, press to final size and thickness, and accurately finish the recesses and projections. The last named plates are frequently provided on their outer faces with various surface markings, such as ornamentation 133, lettering 134, gauge marks 135, etc., and these can be readily embossed thereon as an incident to the final swaging operation by suitably forming the face of the die 110, as above described (Fig. 14) in connection with the application of the minute track 114 to the pillar plate.

It will be seen that, in accordance with the invention, watch frame plates of the intricate configuration described are produced almost entirely by a relatively few, simple swaging or die pressing and punching operations which take the place of the numerous delicate and highly skilled machine operations heretofore required for this purpose, the shape, size, depth or height, relative position, etc., of the various recesses and projections making up such configuration, as well as the location of the various centers, being, for the most part, all determined by the shape and position of the dies and punches and the stroke of the presses employed, so that when said dies and punches have once been accurately made and set, and the press strokes properly adjusted, absolutely accurate and uniform frame plates can be rapidly produced in quantities with practically no skilled attention on the part of the operator. The few remaining operations, such as the facing of the plate 112 shown in Fig. 13 (if this is done at all!), the machining out of the recess 30 as indicated in Figs. 3 and 18, and the drilling and tapping of the screw holes are all relatively simple ones which can be readily controlled with a minimum amount of skill, the first and second being capable of being performed by automatic machines which can be pre-set to cut to exactly the proper points, and the positions at which the second and third are to be performed being pre-located by the die pressing operations.

We claim:

1. The method of making a time-piece frame plate having overlapping recesses in its opposite sides which includes preparing a blank of approximately the size and shape, but of a volume slightly greater than that of the desired plate, inserting said blank between a pair of opposed dies each of which bears a projecting portion, said projecting die portions being solely in partial juxtaposition with each other, die pressing said blank between said dies thereby simultaneously to form in opposite sides of said blank partially-overlapping recessed portions, subjecting said blank to another die pressing operation to bring at least a portion of the bottom of the recessed portion in each of the opposite sides of the blank simultaneously and accurately into final desired relation, excess material being forced to flow into unconfined space in directions generally perpendicular to the direction of major force application during said last-mentioned die pressing operation, and thereafter removing said excess material.

2. The method of making a time-piece frame plate having overlapping recesses in its opposite sides which includes preparing a blank of approximately the size and shape, but of a volume slightly greater than that of the desired plate, inserting said blank between a pair of opposed dies each of which bears a projecting portion, said projecting die portions being solely in partial juxtaposition with each other, die pressing said blank between said dies thereby simultaneously to form in opposite sides of said blank partially-overlapping recessed portions, subjecting said blank to another die pressing operation to bring at least a portion of the surface of each of the opposite sides of the blank simultaneously and accurately into final desired relation, excess material being forced to flow outwardly, in directions generally perpendicular to the direction of major force application during said last-mentioned die pressing operation, into unconfined space at the periphery of said blank to form an edge flashing, and thereafter peripherally trimming the recessed blank to desired size by removing said flashing.

3. The method of making a time-piece frame plate having overlapping recesses in its opposite sides which includes preparing a blank of approximately the size and shape, but of a volume slightly greater than that of the desired plate, inserting said blank between a pair of opposed dies each of which bears a projecting portion, said projecting die portions being solely in partial juxtaposition with each other, die pressing said blank between said dies to form in opposite sides of said blank partially overlapping recessed portions while simultaneously increasing the thickness of said blank in at least one portion of its area, subjecting said blank to another die pressing operation to bring at least a portion of the surface of each of the opposite sides of the blank simultaneously and accurately into final desired relation, excess material being forced to flow into unconfined space in directions generally perpendicular to the direction of major force application during said last-mentioned die pressing operation, and thereafter removing said excess material.

4. The method of making a time-piece frame plate having one or more recesses in one of its faces which includes preparing a blank of approximately the size and shape, but of a volume slightly greater than that of the desired plate, subjecting said blank to a preliminary die pressing operation to form the blank roughly to the desired thickness and roughly with the desired recess in one of its faces, subjecting the partially shaped blank to another die pressing operation simultaneously to bring the unrecessed portion of the recessed face accurately into final desired relation to the opposite face and the recess bottom accurately into final desired relation to both said faces, excess material being forced to flow outwardly, in directions generally perpendicular to the direction of major force application during said last-mentioned die pressing operation, into unconfined space at the periphery of said blank to form an edge flashing, and thereafter peripherally trimming the recessed blank to desired size by removing said flashing.

5. The method of making intricately-recessed frame plates for time-pieces which includes inserting a blank between a pair of opposed dies each of which bears a series of adjoining projections of varying height, the projections of one of said dies being substantially complementary to at least a portion of the recess pattern desired on the joint side of the frame plate, and the projections of the other of said dies being substantially complementary to at least a portion of the recess pattern desired on the opposite side of the frame plate, the projections of one die being non-identical with the projections of the other die and solely in partial juxtaposition therewith, pressing said blank between said dies thereby simultaneously to form on opposite sides of said blank non-identical partially overlapping recess patterns respectively complementary to the projections on the operative faces of said dies, the recess pattern on each side of said blank including a plurality of communicating recesses of varying depth, subjecting said blank to another pressing operation accurately to shape one side of the blank and to bring bottoms of recesses on opposite sides of said blank into final desired relation to said accurately shaped side and to each other, and then establishing communication between the non-identical recess patterns on the opposite sides of said blank by turning one of the recesses, located at least partially in the zone of overlap of said recess patterns, to an extent sufficient to remove intervening material and bring said recess patterns into communication with each other.

6. The method of making intricately-recessed frame plates for time-pieces which includes inserting a blank between a pair of opposed dies each of which bears a series of adjoining projections of varying height, the projections of one of said dies being substantially complementary to at least a portion of the recess pattern desired on the joint side of the frame plate, and the projections of the other of said dies being substantially complementary to at least a portion of the recess pattern desired on the opposite side of the frame plate, the projections of one die being non-identical with the projections of the other die and solely in partial juxtaposition therewith, pressing said blank between said dies thereby simultaneously to form on opposite sides of said blank non-identical partially overlapping recess patterns respectively complementary to the projections on the operative faces of said dies, the recess pattern on each side of said blank including a plurality of communicating recesses of varying depth, subjecting said blank to another pressing operation accurately to shape one side of the blank and to bring bottoms of recesses on opposite sides of said blank into final desired relation to said accurately shaped side and to each other, establishing communication between the non-identical recess patterns on the opposite sides of said blank by turning one of the recesses, located at least partially in the zone of overlap of said recess patterns, to an extent sufficient to remove intervening material and bring said recess patterns into communication with each other, and thereafter punching the blank to enlarge the area of communication between said recess patterns.

7. The method of making a time-piece frame plate having overlapping recesses in its opposite sides which includes preparing a blank of approximately the size and shape, but of a volume slightly greater than that of the desired plate, inserting said blank between a pair of opposed dies each of which bears a projecting portion, said projecting die portions being solely in partial juxtaposition with each other, die pressing said blank between said dies thereby simultaneously to form in opposite sides of said blank partially-overlapping recessed portions, subjecting said blank to another die pressing operation to bring at least a portion of the bottom of the recessed portion in each of the opposite sides of the blank simultaneously and accurately into final desired relation, excess material being forced to flow into unconfined space in directions generally perpendicular to the direction of major force application during said last-mentioned die pressing operation, removing said excess material, and thereafter facing-off said plate to some predetermined final thickness.

PIERRE DUMAINE.
ARTHUR P. EMMERT.

CERTIFICATE OF CORRECTION.

Patent No. 2,291,456. July 28, 1942.

PIERRE DUMAINE, ET AL.

It is hereby certified that error appears in the printed specification of the above numbered patent requiring correction as follows: Page 3, second column, line 36, for "by" read --for--; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.